US007578262B2

(12) United States Patent  (10) Patent No.: US 7,578,262 B2
Vaccari  (45) Date of Patent: Aug. 25, 2009

(54) FILTRATION APPARATUS FOR AQUARIA

(75) Inventor: Carlo Vaccari, Castelgomberto (IT)

(73) Assignee: Ferplast SpA (IT)

( * ) Notice: Subject to any disclaimer, the term of this patent is extended or adjusted under 35 U.S.C. 154(b) by 596 days.

(21) Appl. No.: 10/556,321

(22) PCT Filed: May 12, 2004

(86) PCT No.: PCT/IT2004/000263

§ 371 (c)(1),
(2), (4) Date: Nov. 10, 2005

(87) PCT Pub. No.: WO2004/100654

PCT Pub. Date: Nov. 25, 2004

(65) Prior Publication Data

US 2007/0039557 A1  Feb. 22, 2007

(30) Foreign Application Priority Data

May 14, 2003  (IT) .......................... VR2003A0060

(51) Int. Cl.
 A01K 63/04 (2006.01)
(52) U.S. Cl. .................. 119/259; 119/260; 210/416.2
(58) Field of Classification Search ................. 119/260, 119/261, 262, 259; 210/416.2, 336, 167.22, 210/348
See application file for complete search history.

(56) References Cited

U.S. PATENT DOCUMENTS 1,927,228 A * 9/1933 Compton .................... 210/489
3,138,551 A * 6/1964 Jones ......................... 210/778
3,669,297 A * 6/1972 Willinger .................... 210/94
4,067,809 A * 1/1978 Kato ...................... 210/167.21
5,171,438 A * 12/1992 Korcz .................... 210/167.22
6,187,183 B1 * 2/2001 Weaver et al. ............... 210/150
6,210,567 B1 * 4/2001 Takada ................... 210/167.22
2003/0047509 A1 * 3/2003 Whitehill .................... 210/616

FOREIGN PATENT DOCUMENTS

| DE | 29516600 | 1/1996 |
| DE | 29905996 | 6/1999 |
| EP | 0484896 | 5/1992 |
| JP | -40304303 | * 2/1991 |

OTHER PUBLICATIONS

International Search Report for PCT Application No. PCT/IT2004/000263.

* cited by examiner

Primary Examiner—Trinh T. Nguyen
(74) Attorney, Agent, or Firm—Greenberg Traurig, LLP

(57) ABSTRACT

A filtration device (10) for aquarium tanks comprises a body (11), divided using special baffles (12) into a set number of intercommunicating chambers (I, II, III etc . . . ) can be housed so that during the filtration process the water follows a zigzag route; it al comprises an infeed point (15) for the water to be purified, a temperature regulation unit (13) and a pump (14) enabling the recirculation of the water. The body (11) is fitted entirely inside the tank and the filtration elements (A; B; C etc . . . ) are located between at least one pump (14) and at least one infeed point (15) to enable entry of the water into the filtration system mainly from below upwards and exit of the water from above downwards.

28 Claims, 4 Drawing Sheets

FILTRATION APPARATUS FOR AQUARIA

This application is a national stage filing under 35 U.S.C. 371 of International Application PCT/IT2004/000263, filed on May 12, 2004 which claims priority from Italian Application No. VR2003A 000060, filed on May 14, 2003. The entire teachings of the referenced application is incorporated herein by reference. International Application PCT/IT2004/000263 was published under PCT Article 21(2) in English.

1. Technical Field

The present invention concerns a filtration device for aquaria.

More specifically the present invention concerns a filtration device for aquaria capable of ensuring the homeostasis of the microcosm making up the aquarium thus enabling the survival of all the organisms contained therein thanks to a combined multiple filtration system using at least one mechanical filtration element and at least one biological filtration element.

The present invention finds specific application in the manufacture of products for small animals with specific reference to the aquarium sector.

2. Background Art

Water filtration systems for the removal of suspended particles and oxidation of the nitrogen compounds dissolved therein are of primary importance in the process used to make ground water drinkable, in the transformation of industrial waste, in aquaculture and in the upkeep of public and domestic aquaria.

Various filtration systems have been designed which are reasonably efficient at oxidation and which are capable of ensuring excellent performance in the long term.

The continuous development of new filtration materials and the identification of substrates characterised by specific physical and chemical properties such as a high surface area, low specific weight and a microporous surface suitable for adsorption processes and the scientific advances in this sector have all enabled the design of filtration systems which are increasingly more compact and have high efficiency ratings.

A suitable filtration system must operate on various levels. Specifically, it must block particles of organic detritus through mechanical action and promote the life of the aerobic bacterial flora responsible for the oxidation of the nitrogen compounds produced by aquatic animals (including ammonia and nitrites). In addition, it must complete the nitrification process, directly and selectively adsorb specific pollutants, ensure the circulation of water and control and correct the temperature of the water.

Document EP-A-1013167 describes a filtration device for aquarium tanks and the forced recirculation of water using a filtration means located inside the aquarium tank.

The device comprises a container consisting of a body and cover, division panels to separate the inside into filtration chambers and accumulation boxes for the filtration means which can be fitted in, and removed from the filtration chambers to house a variety of filtration means.

The device described in EP-A-1013167 is designed to allow the water to pass through the zigzag filtration means so that the device maintains its compact size and the filtration means can be removed easily.

Given that it is fitted externally, the filtration device is not inserted directly inside the tank. This increases the dimensions of the aquarium when the filtration device is fitted and also requires a location on the aquarium so that it remains out of sight. However the main disadvantage of this filter is the high risk of water leaks to the outside of the tank.

Document EP-B-0543035 describes a modular aquarium with a filtration tank fitted internally for automatic water recirculation using a filtration bed to eliminate the filtration process residues from the aquarium without having to remove any components.

However, the filter described by the aforementioned document only envisages the presence of a single bacterial bed without the use of further mechanical filters thus significantly limiting the lifecycle and overall efficiency of the filter.

Document WO-A-0060931 refers to a filter for aquaria comprising a body consisting of a material with a filtration function and suitable to divide the aquarium into a first and a second compartment.

The body of the filter is designed to operate in conjunction with a pump positioned in such a way as to move the water through the filtration body and into the second compartment, and to operate with other means to return the filtered water from the second compartment to the first compartment.

The filter also consists of a self-supporting body designed to cover the entire rear surface of the aquarium thus forming a natural decoration for the aquarium.

The filter described above necessarily divides the entire aquarium tank into two chambers thus making cleaning and maintenance difficult. Furthermore, it does not envisage an interchangeable module structure to ensure optimum water quality inside the tank.

DESCRIPTION OF THE INVENTION

The present invention proposes a filtration device for aquaria capable of solving the problems seen with the background art and capable of ensuring the homeostasis of the microcosm making up the aquarium thus enabling the survival of all the organisms contained therein.

Specifically, the filtration device according to the invention consists of a multi-chamber body suitable for housing a variety of filtration systems for example mechanical and/or biological and/or adsorbent and/or chemical, a temperature regulation system for the aquarium water and the water passing through the filter and a pump to circulate the water in the tank.

A further purpose of the present invention is to provide a filtration system in which the various filtration modules are easy to substitute and, with specific reference to the biological filter, to provide a system in which the filter is always active inside the aquarium and can be regenerated quickly.

This is achieved using a filtration system having the characteristics described in the main claim.

The dependent claims describe the advantageous embodiments of the invention.

The filtration device according to the invention comprises a body divided into chambers and special entry and exit routes for the water so that entry of the water into the filtration system mainly occurs from below upwards whereas exit of the water is from above downwards.

The chambers are fitted with special systems to enable the treatment required and specifically, a temperature regulation system, a mechanical filtration system, a biological filtration system, a chemical/adsorbent filtration system and a pump to ensure circulation of the water inside the body of the device.

These systems are listed on after the other in a sequence which matches the flow of water.

Furthermore, the sequence described is optimised to take into consideration various technical factors to enable the greatest possible efficiency of the device according to the invention.

Specifically, according to an advantageous embodiment of the invention, the temperature regulation unit is located in the first chamber. This ensures that even in the event of complete filter clogging the chamber containing the unit is always full of water.

If, for example, the temperature regulation unit was located in another chamber, then a chamber with no water would represent a serious hazard for the user as a result of the functioning of the electrical system on the device.

According to a characteristic of the invention, the transfer of water along the temperature regulation unit hose occurs from above downwards to prevent the formation of stagnant water in the upper part of the compartment which would result in potentially hazardous temperature changes.

Advantageously, the mechanical filter is preceded by a mesh pre-filter, made from plastic for example, to trap large pieces of debris and vegetable tissue residues.

The first filtration step is mechanical to ensure that large particles do not reach the biological filter as this would render the filter inefficient in the long term.

This mechanical filtration process occurs, according to the invention, with a movement from below upwards to encourage sedimentation of suspended particles by gravity and to prevent rapid clogging.

According to the invention, in the next biological filter the water flows from above downwards and thus the water is aerated in the transfer from the mechanical filter system to the biological one.

A second biological filter (where the water flows from below upwards) is important to make provision for overpopulation of the tank, enabling the use of alternative materials or anoxic filters and/or filters with a fluid bed.

The adsorbent filter follows the biological one so that any compounds produced by the bacteria are adsorbed before the water returns to the tank.

According to the standard criteria for the production of traditional aquaria, to obtain a bacterial bed with a surface area suitable for the complete oxidation of the toxic compounds produced in a closed aquatic system, the filtration device must have, depending on the type of aquarium, population and the filtration materials used, a volume of between 10% and 20% of the total volume of the tank.

According to an important advantageous characteristic of the present invention, the filtration device limits the volume of the filtration system to approximately 10% of the total volume of the tank thus reducing the overall dimensions of the aquarium.

According to a particularly advantageous embodiment of the invention, water circulation inside the filtration device is set at between two to three times the volume of the total mass of water being treated per hour, thus optimising the oxidation process.

DESCRIPTION OF THE DRAWINGS

Other characteristics and advantages of the invention will become clear from the following description of an embodiment of the invention, given as a non-limitative example, with the assistance of the following drawings enclosed as an annex, in which.

DESCRIPTION OF ONE EMBODIMENT OF THE INVENTION

Figure 1:
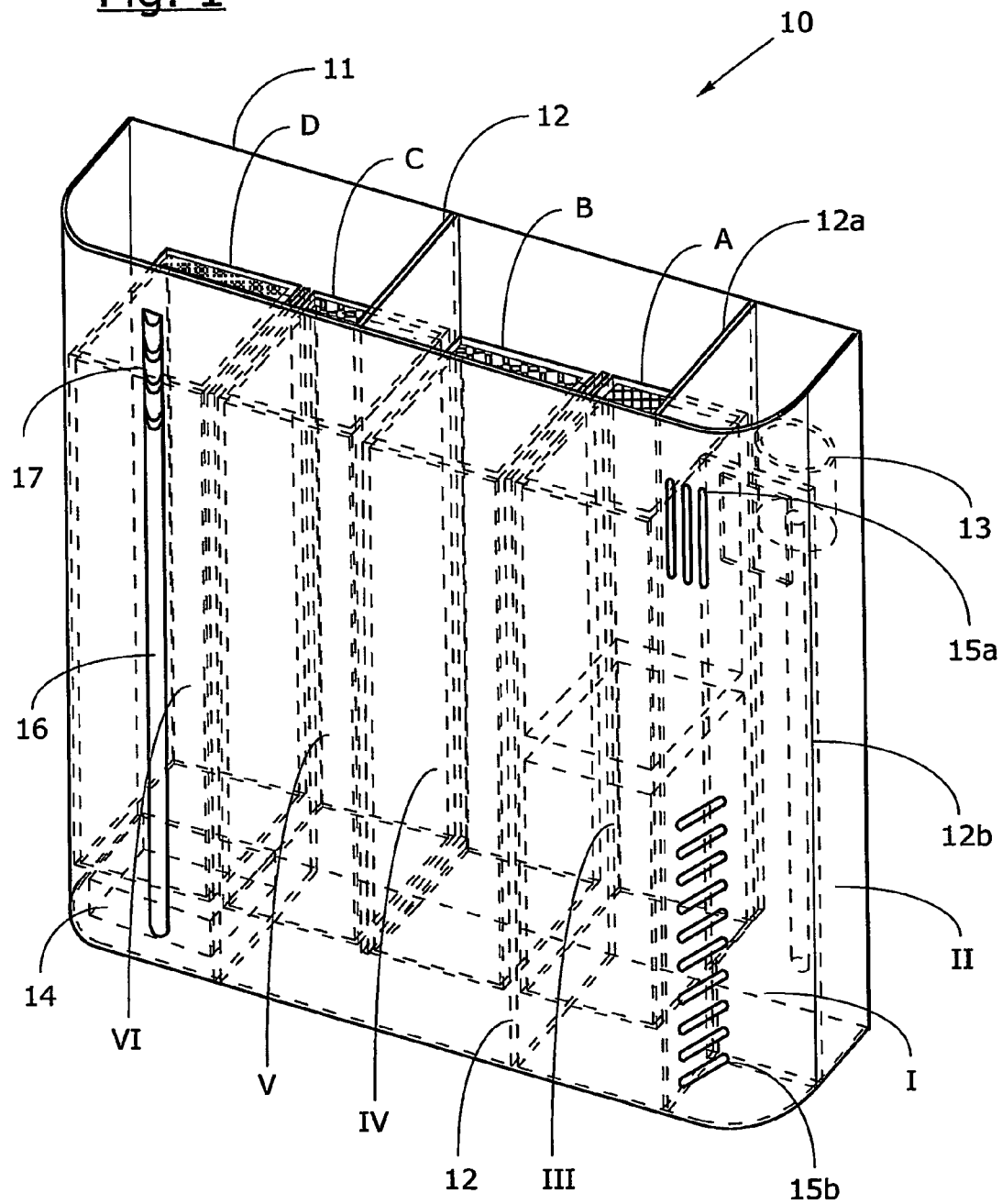
FIG. 1 is a side view from above of a filtration device according to the invention.

In the drawings, the reference number 10 generally indicates a filtration device for aquaria, specifically a filtration device 10, comprising a body 11, divided using special baffles 12, into a set number of intercommunicating chambers I, II, III etc. which can house various filtration elements A, B, C etc. and in which a temperature regulation unit 13 and a pump 14 for recirculating water are installed.

FIG. 1 shows a view of the complete filtration device 10.

According to a specific embodiment of the invention, the entry points 15a and 15b for the water to be purified are visible on the external part of the body 11 whereas at the opposite end a transfer hose 16 can be seen. The latter is designed for the emission of the purified water in the tank just below the level of the water in the aquarium using a diffusion unit 17 located at the end of the hose 16.

According to the present invention water enters chamber I due to the principle of communicating vessels thanks to continuous suction by pump 14 located in chamber VI.

Figure 2:
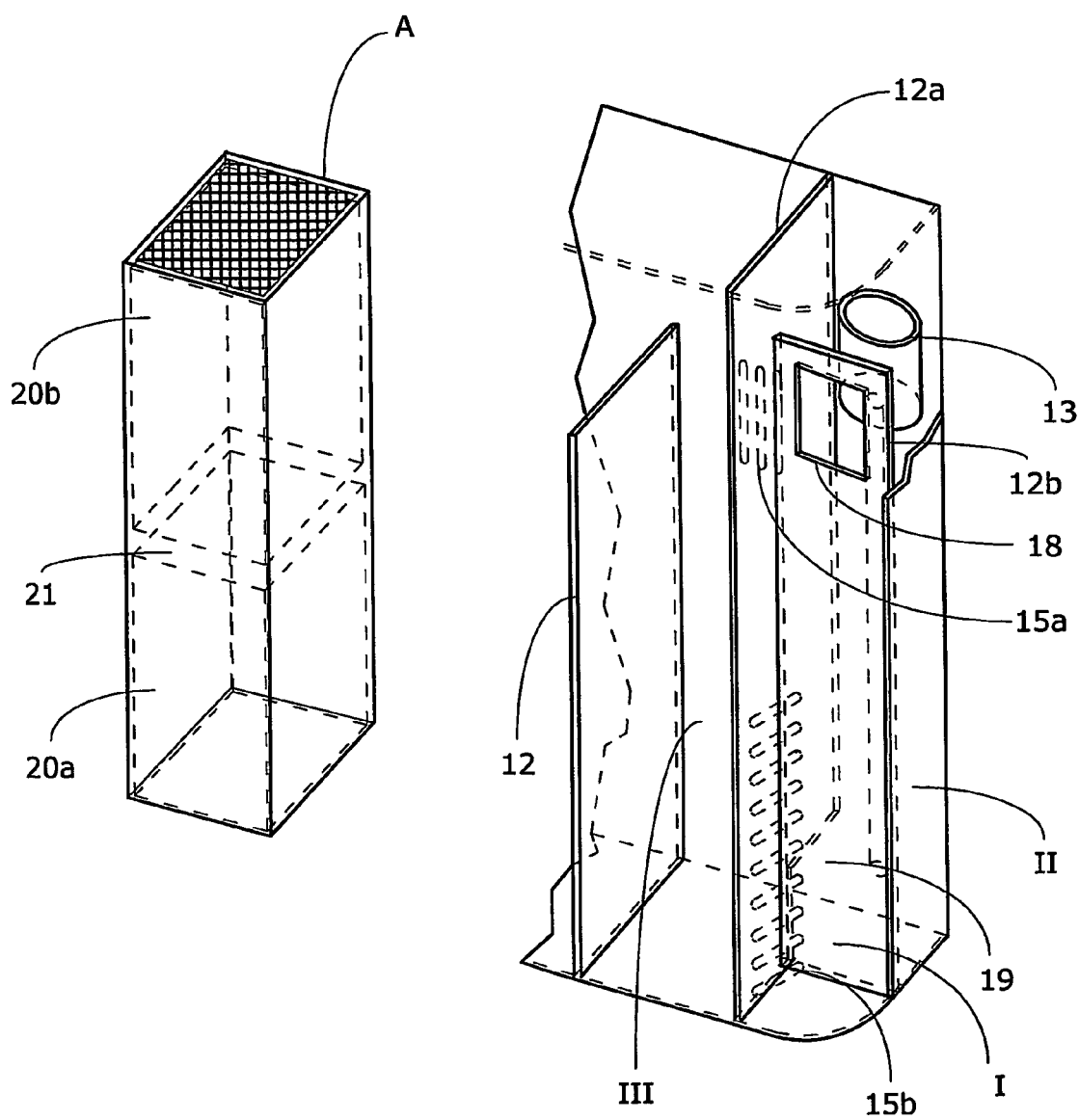
FIG. 2 is a perspective view of chambers I, II and III of the filtration device shown in FIG. 1 with the filtration module A external to chamber III.

As shown in FIG. 2, chamber I is fitted with two infeed points 15a and 15b. A first infeed point 15a is fitted in an upper position to force the movement of the particles present on the surface of the water and to limit the oily coating which is formed on the surface of the water.

According to a specific embodiment the infeed point 15a consists of vertical slits so that the surface of the water is always involved in the infeed movement of the water regardless of evaporation.

The second infeed point 15b is located in the lower part of the device and is the main infeed point designed to collect the debris deposited in the lower part of the aquarium.

Furthermore, by locating the pump outfeed point 14, according to the invention, on the upper part of the filtration device 10, water recirculation inside the tank is from above downwards thus optimising the filtration action.

The water infeed point 15b can be advantageously produced using a set of oblique slits to generate circular currents to create a turbulent force facilitating the entry of particles deposited on the bottom.

The upwards movement imposed on water recirculation inside chamber I ensures the sedimentation of large particles suspended in the water.

These large particles can then be removed using a common suction unit for aquaria. This operation is facilitated by the fact that the baffle 12b can be removed.

The water is transferred to chamber II through the window 18 on the specific baffle 12b where the temperature regulation unit 13 is housed.

According to the invention this procedure is used to ensure a single flow of water which encounters the temperature regulation unit in the movement from above downwards thus enabling more efficient temperature control.

Therefore the convective currents caused by the heating of the water are in the opposite direction to the forced flow. Thus the sensor on the heater, for example a thermostat, detects the temperature of the water in the tank without being influenced by any convective currents and therefore the temperature regulation unit is significantly more efficient.

According to the invention, during the next stage, the water is transferred into chamber III through the window 19, located on the lower part of the baffle 12a, to be subjected to a first mechanical filtration process.

Chamber III is fitted with a filtration element A consisting of, according to a very advantageous embodiment of the invention, a rack fitted with a mechanical pre-filter 20a and 20b made from a material with a porous structure for example a sponge with a wide mesh (from 8 to 15 and preferably 10 ppi) and a sponge with a narrow mesh (from 18 to 25 ppi and preferably 20 ppi).

The water arrives in the pre-filter 20a in a circular movement which assists in the trapping of the largest detritus still present in a small plastic net.

The water then moves upwards from below in the mechanical filtration sponges thus causing the sedimentation of suspended particles as a result of gravity.

According to the invention the particles are distributed over the entire length of the sponge in accordance with size and weight.

There is a cavity 21 between the two mechanical pre-filters 20a and 20b. The cavity is 10 mm and enables the flow to become uniform again before it enters the second stage.

According to the invention this limits the formation of any preferential flows in the first mechanical filtration stage inside the filtration element A of the device 10.

Figure 3:
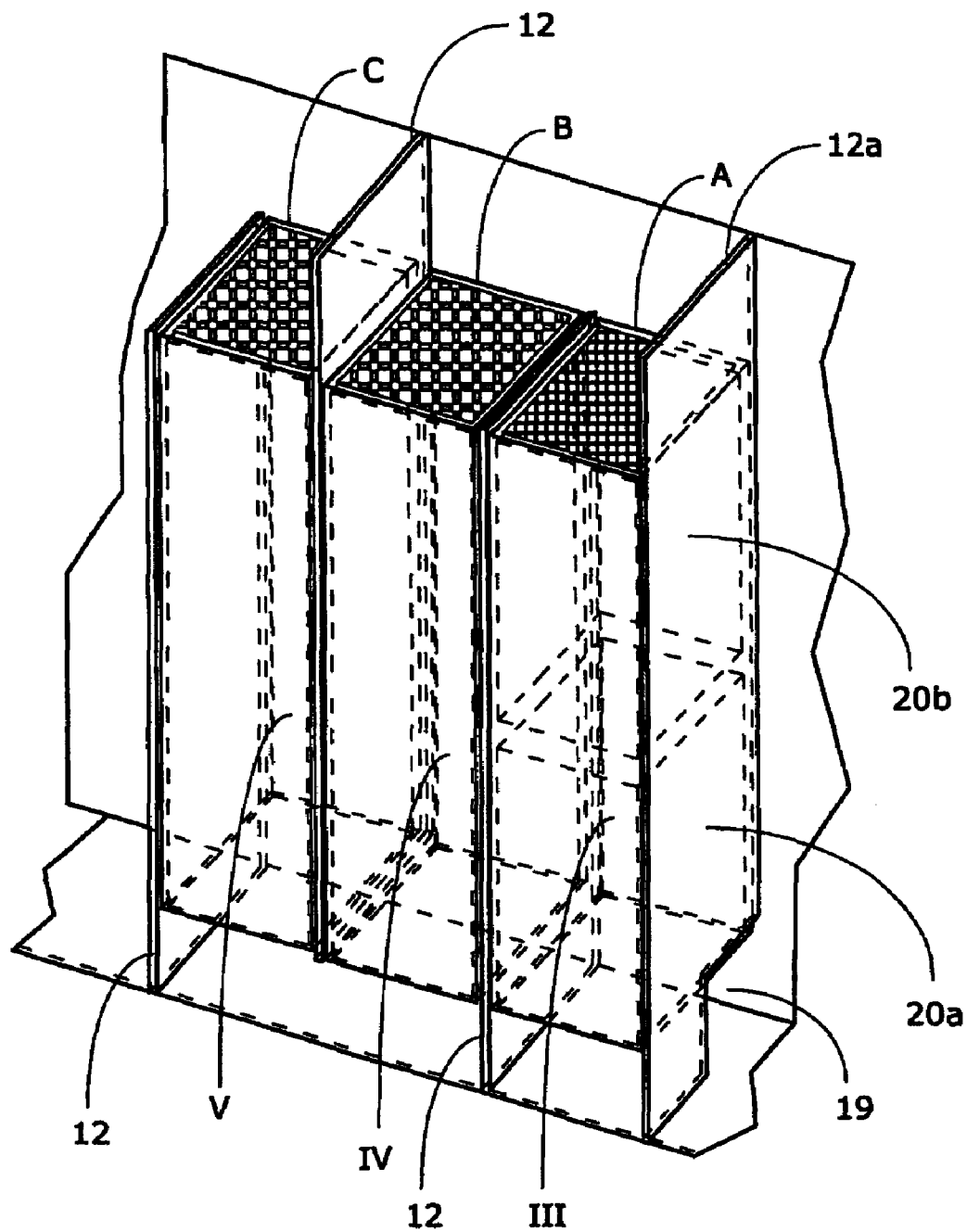
FIG. 3 is a perspective view of chambers III, IV and V of the filtration device shown in FIG. 1 with the filtration modules A, B and C inserted in the respective chambers III, IV and V.

At this point the water is transferred to chamber IV of the device 10 according to the invention (FIG. 3) where it is subjected to a first biological filtration stage by flowing from above downwards.

The transfer of water from chamber III to chamber IV occurs with the flow above the upper sides of the filtration elements A and B.

Contact with air is important for the filtered water to ensure re-oxygenation and to encourage the oxidation performed by the aerobic bacteria present in the filter.

The mechanical filtration sponges host aerobic bacterial flora which during the transfer of the water "consume" the oxygen contained in the water. If the water did not reach the surface it would be depleted of oxygen when entering the biological filter, thus limiting the action of the bacteria, such as those belonging to the *Nitrosomonas* and *Nitrobacter* genera present in the biological substrate of the filtration element B.

During the filtration process according to the invention, the water is then transferred to a second biological filtration stage in chamber V using a filtration element C which, on the one hand ensures good functioning of the filtration device 10 in overpopulated tanks, and on the other enables the substitution of the biological filtration material contained in the filtration element B involved in the filtration process without compromising good functioning of the filtration device 10. According to an important characteristic of the invention, there is always at least one active biological filtration material cartridge inside the system.

Figure 4:
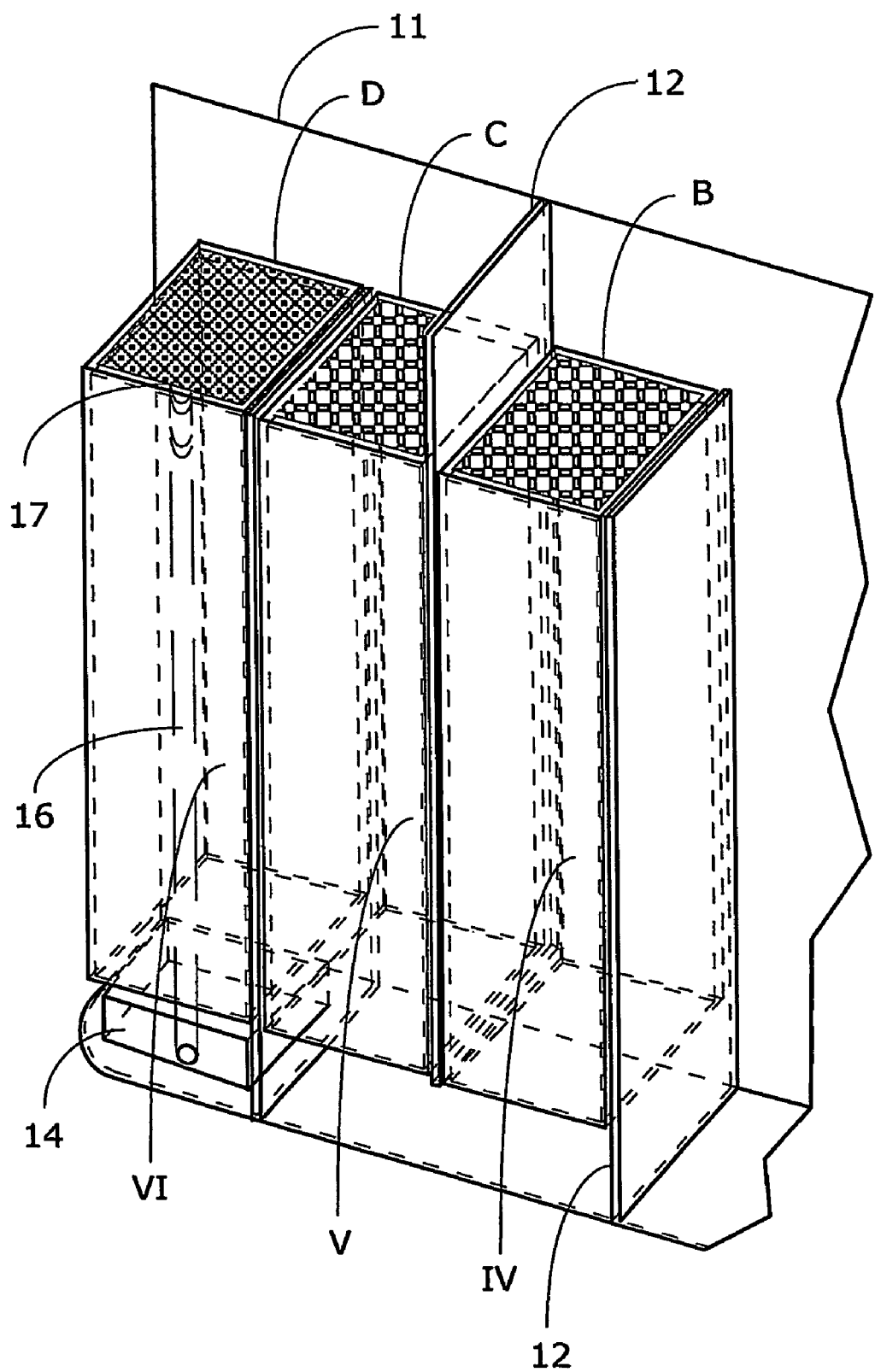
FIG. 4 is a perspective view of chambers IV, V and VI of the filtration device shown in FIG. 1 with the filtration modules B, C and D inserted in the respective chambers IV, V and VI and the recirculation pump.

In the final stage of the water purification process according to the invention, the water is transferred to chamber VI of the device 10 from above downwards and encounters a sponge with fine mesh and added active carbon with an adsorbent function which is, according to a particularly advantageous embodiment of the invention, the filtration element D (FIG. 4). Aromatic and colouring compounds are adsorbed during this stage to ensure that the water is clear.

According to other embodiments of the present invention, special adsorbent or chemically selective materials, such as those having a denitrification or decalcification effect, can be inserted in the filtration element D or placed in chamber VI as independent filtration elements, in accordance with the demands of the user.

At the end of the purification process the water is forced to ascend from the bottom of chamber VI through a hose 16 thanks to the action of a pump 14 and is then transferred to the tank just below the level of the water in the aquarium using a diffusion unit 17.

Thus, according to the invention, the noise that would be created by returning the purified and filtered water to the tank above the level of the water in the aquarium is limited. Furthermore, the loss of dissolved carbon dioxide, a vital element in fresh water aquaria, is also limited.

According to a particularly advantageous embodiment of the invention, the system used to return the water to the aquarium is fitted with an adjustable nozzle. This can be replaced by another nozzle capable, if necessary, using the Venturi effect, of sucking air into the water jet, thus encouraging the oxygenation of the water and the dispersion of carbon dioxide.

The types of filtration materials used in the filtration elements A, B, C etc. of the filtration device 10 can be different and adapted to the specific needs of the aquarium; they are thus easily interchangeable thanks to the structure of the filtration device 10.

Expanded polyurethane with cells of various sizes or synthetic wool, for example, can be used for mechanical filtration in the element A, whereas porous ceramic components acting as a bacterial bed, for example, can be used for biological filtration in the element B.

Other materials used in the present filtration device 10 include sponges with added active carbon, enabling an adsorbent, deodorant and decolouring action, and various calcium substrates, such as aragonite, suitable for use in marine aquaria. These materials can be advantageously inserted in the chamber VI or in the upper part of the chamber V inside the filtration elements C or D or as part of further independent filtration elements.

Another variant in the filtration materials used could include granular active carbon, for example in special cartridges to be inserted in the last chamber as a substitute for the treated sponge for greater filtration action on colourants and aromatic compounds.

Another material which can be advantageously used in the device 10 for filtration according to the invention, specifically in marina aquaria, is aragonite, which has excellent purification properties, stabilises the pH and enables the addition of special pads in saltwater tanks.

Another filtration element containing active peat can be added routinely to chamber VI or the upper part of chamber V, in addition to, or as a substitute for the adsorbent one, to add humic acid to the water. Humic acid is very useful for breeding many species of fish and is capable of stabilising the pH at an acidic level.

The filtration elements for the device 10 according to the invention can envisage, for example, ionic exchange resins acting on phosphates, nitrates, nitrites and zeolites for a very effective adsorbent action on a vast range of molecules, pH stabilisers which can ensure a basic level for a marine aquarium or an acidic level for a fresh water aquarium or might be specific therapeutic modules to replace the adsorbent element D in the last chamber. These modules enable slow-release systems for active compounds useful in the treatment of diseases in fish.

The ability to dismantle the filtration device into its component parts such as the body 11, the division baffles and the interchangeable filtration elements, gives the device excellent flexibility of use and enables easy maintenance.

The description above refers to preferred embodiments of the invention.

It is clear nevertheless that the invention is susceptible to numerous variations within the framework of technical equivalents.

The invention claimed is:

1. A filtration device for an aquarium tank comprising:
a body divided by division baffles into a preset number of intercommunicating chambers, inside of which can be housed various filtration elements so that during a filtration process, water follows a zigzag route;
an infeed point for the water to be purified;
a temperature regulation unit; and
a pump enabling the recirculation of the water;
wherein the body is contained entirely within the tank, wherein the filtration elements are positioned between at least one pump and at least one infeed point to enable entry of the water into the filtration system mainly from below upwards and outfeed of the water from the system from above downwards, and wherein said filtration elements comprise at least a mechanical filtration element and a biological filtration element, each mechanical filtration element being placed upstream of a respective biological filtration element, characterised in that each mechanical filtration element and each biological filtration element is housed inside a distinct chamber and in that an open air space is provided above adjacent mechanical filtration elements and biological filtration elements, whereby the water flowing inside the filtration device in operation contacts air while flowing from a chamber housing a mechanical filtration element to the adjacent chamber housing a biological filtration element.

2. The filtration device of claim 1 further comprising at least two interchangeable and independent biological filtration elements.

3. The filtration device of claim 1 further comprising adsorbent filtration elements which regulate the ionic content and equilibrium of the water.

4. The filtration device of claim 1 wherein the temperature regulation unit is located near the infeed point for the water which must be filtered.

5. The filtration device of claim 1 wherein the filtration elements are positioned starting from the infeed point so that they are located in the order of at least one mechanical filtration element, at least one biological filtration element and at least one further mechanical filtration element.

6. The filtration device of claim 1 further comprising a first infeed point located above the aquarium water level and a second infeed point located in the lower part of the filtration device.

7. The filtration device of claim 6 wherein the first infeed point comprises vertical slits.

8. The filtration device of claim 6 wherein the second infeed point for the water comprises a set of oblique slits suitable for generating circular currents which create a turbulent force.

9. The filtration device of claim 1 wherein the pump is located at the bottom of a last intercommunicating chamber.

10. The filtration device of claim 1 wherein the pump comprises a feed hose and a diffusion unit.

11. The filtration device of claim 10 wherein the diffusion unit connected to the pump is located below the level of the water.

12. The filtration device of claim 10 wherein the diffusion unit is fitted with a special adjustable nozzle which using the Venturi effect is capable of adding air to the water jet.

13. The filtration device of claim 1 wherein the mechanical filtration located in the first chamber comprises a first mechanical filter and a second mechanical filter in which the first mechanical filter has a larger mesh than the second mechanical filter.

14. The filtration device of claim 13 wherein the first mechanical filter is made from a material with a porous structure such as sponge with a mesh of 8 to 15 ppi and the second mechanical filter is also made from a material with a porous structure such as sponge with a mesh of 18 to 25 ppi.

15. The filtration device of claim 13 further comprising a cavity between the first mechanical filter and the second mechanical filter.

16. The filtration device of claim 15 wherein the cavity is at least 10 mm.

17. The filtration device of claim 13 wherein the mechanical filtration element located in the first chamber comprises a plastic net.

18. The filtration device of claim 1 wherein the mechanical filtration elements comprise filters made from at least one of an expanded polyurethane and synthetic wool.

19. The filtration device of claim 1 wherein the biological filtration elements comprise colonies of bacteria belonging to the Nitrosomonas and Nitrobacter genera.

20. The filtration device of claim 1 wherein biological filtration elements comprise culture beds made from porous ceramic material.

21. The filtration device of claim 1 wherein at least one filtration element located immediately after the biological filtration element contains active carbon, in granular form.

22. The filtration device of claim 1 wherein it is fitted with a filtration system with a volume equal to approximately 10% of the total volume of the tank.

23. The filtration device of claim 1 wherein the the device recirculates two to three times the total volume of water inside the device per hour.

24. The filtration device of claim 5 further including an adsorbent filtration element.

25. The filtration device of claim 24 further including an element to regulate the ionic content and equilibrium of the water.

26. The filtration device of claim 25 further including an element to stabilise the pH and to slowly release therapeutic chemical compounds.

27. The filtration device of claim 21 wherein at least one filtration element located immediately after the biological filtration element further comprises aragonite.

28. The filtration device of claim 27 wherein at least one filtration element located immediately after the biological filtration element further comprises active peat.

* * * * *